UNITED STATES PATENT OFFICE.

GEORGE D. LONG AND EUGENE W. RAPP, OF GRANITE CITY, ILLINOIS.

SOLDERING ALLOY.

1,107,082.     Specification of Letters Patent.     Patented Aug. 11, 1914.

No Drawing.     Application filed May 15, 1914. Serial No. 838,858.

*To all whom it may concern:*

Be it known that we, GEORGE D. LONG and EUGENE W. RAPP, citizens of the United States, residing at Granite City, in the county of Madison and State of Illinois, have invented new and useful Improvements in Soldering Alloys, of which the following is a specification.

The present invention relates to the production of a composition of matter suitable for use as a solder which shall have the advantages over ordinary solder, that it can be used in connection with various metals such as aluminum, galvanized iron, brass, tin, silver, and bronze, or for soldering a piece of any of the above metals to a piece of another one of the above metals. The solder as herein described produces a strong joint between metals of the kinds above referred to, and moreover is easily applied, and requires in most cases no fluxing agent.

The alloy consists of the following materials, preferably in the proportions stated, although these proportions may be varied more or less without materially injuring the properties of the product.

| | |
|---|---|
| Aluminum | 400 parts. |
| Zinc | 400 parts. |
| Tin | 760 parts. |
| Bismuth | 8 parts. |
| Copper | 8 parts. |
| Antimony | 28 parts. |
| Mercury | 1 to 2 parts. |
| Total | 1606 parts. |

In producing the alloy we preferably proceed as follows:—

The aluminum is melted in a suitable receptacle, for example an iron pot placed over a forge, thereafter all the impurities and dross are removed from the surface by carefully skimming. After this a small quantity of hydrochloric acid, say about two gallons of strong hydrochloric acid is added to the molten metal, while maintained at a temperature slightly above its melting point, the acid preferably being introduced near the bottom of the mass of molten metal, in order to thoroughly agitate and purify the metal. C. P. hydrochloric acid is preferable. Then an amount of tin substantially equal to the aluminum is added, and mixed during melting. Thereafter an equivalent amount of zinc is added, and the material is mixed while melting. Thereafter an equivalent amount of pewter (consisting of tin 90 parts, antimony 7 parts, bismuth 2 parts, and copper 2 parts) is added, and the material is again stirred. Thereafter the mercury is added and the material again thoroughly stirred, in order to make a substantially uniform mixture. The alloy is then ready for casting into sticks or other shapes, of the sizes ordinarily employed for putting up solder for the market.

We call attention to the fact that the pewter employed is one that does not contain lead, since we have found lead to be a material disadvantage in solders of this kind, since it weakens the solder, and also prevents good adhesion to the metal being treated.

In order to apply this solder, the article to be soldered is heated, for example by means of a gasolene torch, and the heated surface is then rubbed with a wire brush to remove the scale and the like, the solder is then heated nearly to melting in the blowtorch flame, and is then applied to the heated surface. If the article to be soldered has much grease on its surface, it is sometimes preferable to treat the surface first with acid, to remove this grease, but this is not ordinarily necessary. When the solder is melted, or is in a soft condition, it may be spread around more or less in substantially the same manner as butter is spread on bread. The other material is then applied and allowed to cool in the usual manner.

In soldering brass or aluminum, it is preferable to first file the surface, or to scratch and roughen the surface of the article, with a file or similar instrument.

What we claim is:—

1. An alloy containing aluminum, zinc, tin, bismuth, copper, antimony and mercury.

2. An alloy containing aluminum 400 parts, zinc 400 parts, tin 760 parts, bismuth 8 parts, copper 8 parts, antimony 28 parts, mercury not over 2 parts.

In testimony whereof we affix our signatures in presence of two witnesses.

GEORGE D. LONG.
EUGENE W. RAPP.

Witnesses:
OTTO L. HAUSEL,
S. BUCHEK.